(12) United States Patent
Lammens

(10) Patent No.: US 11,586,161 B2
(45) Date of Patent: Feb. 21, 2023

(54) MACHINE LEARNING APPROACH FOR FATIGUE LIFE PREDICTION OF ADDITIVE MANUFACTURED COMPONENTS ACCOUNTING FOR LOCALIZED MATERIAL PROPERTIES

(71) Applicant: Siemens Industry Software NV, Leuven (BE)

(72) Inventor: Nicolas Lammens, Kessel-Lo (BE)

(73) Assignee: Siemens Industry Software NV, Leuven (BE)

( * ) Notice: Subject to any disclaimer, the term of this patent is extended or adjusted under 35 U.S.C. 154(b) by 0 days.

(21) Appl. No.: 17/606,285

(22) PCT Filed: Jul. 10, 2019

(86) PCT No.: PCT/EP2019/068598
§ 371 (c)(1),
(2) Date: Oct. 25, 2021

(87) PCT Pub. No.: WO2020/216458
PCT Pub. Date: Oct. 29, 2020

(65) Prior Publication Data
US 2022/0146990 A1    May 12, 2022

(30) Foreign Application Priority Data
Apr. 26, 2019  (EP) .................................... 19171344

(51) Int. Cl.
*G05B 13/02*   (2006.01)
*B33Y 50/00*   (2015.01)
(Continued)

(52) U.S. Cl.
CPC ............ *G05B 13/027* (2013.01); *B33Y 50/00* (2014.12); *G05B 19/4099* (2013.01);
(Continued)

(58) Field of Classification Search
CPC .............................. G05B 13/027; B33Y 50/00
(Continued)

(56) References Cited

U.S. PATENT DOCUMENTS

2014/0156229 A1  6/2014 Norato et al.
2015/0269289 A1  9/2015 Kim et al.
(Continued)

FOREIGN PATENT DOCUMENTS

CN  107958114 A   4/2018
CN  108804794 A  11/2018
(Continued)

OTHER PUBLICATIONS

Douard, Amélina, Christelle Grandvallet, Franck Pourroy, and Frédéric Vignat. "An Example of Machine Learning Applied in Additive Manufacturing." In 2018 IEEE International Conference on Industrial Engineering and Engineering Management (IEEM), pp. 1746-1750. IEEE, 2018.

(Continued)

*Primary Examiner* — Ricky Go
(74) *Attorney, Agent, or Firm* — Lempia Summerfield Katz LLC

(57) ABSTRACT

A method and a system for fatigue life prediction of additive manufactured components accounting for localized material properties. The method and the system is employed for prediction of fatigue life properties of an additive manufactured element, with a data collection step in which several data points for maximum stress vs. cycles to failure for different given processing steps of the element are collected, with a training step in which a Machine Learning system is trained with the collected data, and with an evaluation step in which the trained Machine Learning system is confronted with actual processing steps and used to predict the fatigue life properties of the element.

10 Claims, 2 Drawing Sheets

(51) Int. Cl.
G06N 20/00 (2019.01)
G05B 19/4099 (2006.01)
G05B 23/02 (2006.01)

(52) U.S. Cl.
CPC ..... *G05B 23/0243* (2013.01); *G05B 23/0254* (2013.01); *G05B 23/0283* (2013.01); *G06N 20/00* (2019.01); *G05B 2219/49007* (2013.01)

(58) Field of Classification Search
USPC .......................................................... 702/34
See application file for complete search history.

(56) References Cited

U.S. PATENT DOCUMENTS

| 2017/0032281 | A1* | 2/2017 | Hsu .......................... H04L 67/10 |
| 2018/0330029 | A1 | 11/2018 | Pedersen et al. |
| 2020/0111018 | A1* | 4/2020 | Golovin .............. G06F 11/3409 |
| 2020/0147889 | A1* | 5/2020 | Dheeradhada .......... G06F 30/27 |
| 2021/0357555 | A1* | 11/2021 | Liu .......................... G06F 30/23 |
| 2022/0197262 | A1 | 6/2022 | Schwaderer et al. |

FOREIGN PATENT DOCUMENTS

| CN | 108875138 A | 11/2018 |
| CN | 109598079 A | 4/2019 |
| DE | 102019110360 A1 | 10/2020 |
| EP | 3459715 A1 | 3/2019 |
| GB | 2572327 A | 10/2019 |
| WO | 2018217903 A1 | 11/2018 |
| WO | 2020216458 A1 | 10/2020 |

OTHER PUBLICATIONS

Hedayati, R., et al. "Computational prediction of the fatigue behavior of additively manufactured porous metallic biomaterials." International journal of fatigue 84 (2016): 67-79.

Jiasheng Wang, "Life time estimation of components made of ductilecast iron based on local material characteristics" NAFEMS Material Properties in Structure Analysis, Mar. 2019, ISBN 978-1-910643-19-8, p. 21-36.

Notice of Transmittal of the International Patentability Report on Patentability for International Patent Application No. PCT/EP2019/068598 dated Jul. 27, 2021.

Shamsaei, Nima, et al. "An overview of Direct Laser Deposition for additive manufacturing; Part II: Mechanical behavior, process parameter optimization and control." Additive Manufacturing 8 (2015): 12-35.

Zhan, Zhixin, Hua Li, and K. Y. Lam. "Development of a novel fatigue damage model with AM effects for life prediction of commonly-used alloys in aerospace." International Journal of Mechanical Sciences 155 (2019): 110-124.

\* cited by examiner

MACHINE LEARNING APPROACH FOR FATIGUE LIFE PREDICTION OF ADDITIVE MANUFACTURED COMPONENTS ACCOUNTING FOR LOCALIZED MATERIAL PROPERTIES

CROSS REFERENCE TO RELATED APPLICATIONS

This present patent document is a § 371 nationalization of PCT Application Serial Number PCT/EP2019/068598, filed Jul. 10, 2019, designating the United States, which is hereby incorporated in its entirety by reference. This patent document also claims the benefit of EP 19171344.5, filed on Apr. 26, 2019, which is also hereby incorporated in its entirety by reference.

FIELD

Embodiments relate to a method and a system for fatigue life prediction of additive manufactured components accounting for localized material properties.

BACKGROUND

Fatigue properties (how long a part survives a certain repetitive load) of additive manufactured components are strongly dependent on the exact way the part has been printed and post-processed. FIG. 1 depicts the scatter in fatigue behavior of additive manufactured titanium alloy specimens obtained from an extensive literature review. FIG. 1 depicts the Maximal Stress vs. the Cycles to failure.

The scatter is a consequence of the way the part has been printed and post-processed. The printing and post-processing affects both the pure material properties, but also the occurrence of artefacts such as roughness or presence of porosities. To accurately predict the fatigue behavior of a component, it is thus necessary to treat fatigue life as a function of many parameters (including roughness, porosities . . . ).

One problem with fatigue prediction for additive manufacturing is that the fatigue life of any experimental component is always a result of the combined influence of multiple parameters affecting the fatigue life. A second problem is due to the large number of parameters and interactions occurring so that it is difficult to develop, define and calibrate a mathematical model that describes how these different parameters interact. Further, fatigue affecting parameters are not constant over a complex component, requiring localized material properties to account for fatigue life.

Accordingly, a problem to be solved is two-fold, first how to describe the relationship between the different parameters and the resulting fatigue life using a machine learning approach, and second how to predict fatigue lives for complex components where parameters such as roughness vary over the entire part (and thus, fatigue behavior is no longer constant over the entire part).

To describe the relationship between the different parameters and the resulting fatigue life several approaches are available.

Printing parameters (laser power, speed . . . ) have been introduced into a damage approach. The limitations are (i) the a-priori assumption on how the parameters need to be combined in a single parameter, (ii) they may only account for part-level fatigue and not include variations throughout the part and (iii) it is not possible to account for artefacts such as surface roughness or porosities.

For conventional casting of ductile iron, an artificial neural network has been explored to classify the quality of casting (high, normal and low) and predict a scaling factor based on a nearest-neighbor approach. This approach however considers global properties only (i.e., tensile strength) and only looks to refine existing empirical rules that relate static strength to fatigue properties. The methodology does not consider the local effects that impact fatigue life and is completely reliant on an existing empirical rule to relate the different factors to fatigue life. In absence of existing empirical rules (that are currently non-existent in additive manufacturing), the methodology is unable to provide the necessary insights to generate a fatigue prediction methodology. (Reference: Lebensdauerabschatzung von Bauteilen aus Sphäroguss auf der Grundlage der lokalen Materialeigenschaften, J. Wang (Knorr-Bremse) at NAFEMS conference Dresden March 2019).

Some empirical rules exist from conventional manufacturing that give some guideline on how to compensate for certain artefacts. The limitations are that they are empirically derived for casting or forging, and it is not sure the conclusions may be transferred to additive manufacturing, and that they only look at artifacts such as surface roughness or porosities, but no rules exist that consider print orientation (a parameter that is non-existent in casting or forging).

Some authors have explored the use of machine learning to predict the occurrence of artefacts (e.g., by monitoring sound output during printing). However, these papers only focus on predicting or detecting an artefact but do not look at how they affect fatigue life and what mathematical model should be used to predict fatigue in the presence of artefacts.

Document WO 2018/217903 A1 discloses a method to improve additive manufacturing using the trained algorithm to classify defects.

Document EP 3 459 715 A1 depicts a method to predict defects in an on-line monitoring fashion.

Document NIMA SHAMSAEI ET AL: "An overview of Direct Laser Deposition for additive manufacturing; Part II: Mechanical behavior, process parameter optimization and control", ADDITIVE MANUFACTURING, vol. 8, 1 Oct. 2015, pages 12-35, DOI: 10.1016/j.addma.2015.07.002 deals with the physics of the correlation of the additive manufacturing process and the fatigue life.

Document HEDAYATI R ET AL: "Computational prediction of the fatigue behavior of additively manufactured porous metallic biomaterials", INTERNATIONAL JOURNAL OF FATIGUE, ELSEVIER, AMSTERDAM, NL, vol. 84, 2 Dec. 2015, pages 67-79, DOI: 10.1016/J.IJFATIGUE.2015.11.017 deals with fatigue life properties of additively manufactured parts.

Standard interpolation has likely been used in the past without publications as this is a standard approach. The method has serious limitations, however. First, multi-dimensional interpolation cannot extrapolate outside the range of available test points and thus requires extensive test data over a wide range to be available, and second, only prediction within the confines of calibration points is possible.

Accordingly, it is difficult to predict fatigue lives for complex components. Several software vendors already implement a zoning approach where a complex part is split up in multiple sections with different material properties assigned to each section. However, this method does not describe how the different properties for each section should be calculated.

BRIEF SUMMARY AND DESCRIPTION

The scope of the present invention is defined solely by the appended claims and is not affected to any degree by the statements within this summary. The present embodiments may obviate one or more of the drawbacks or limitations in the related art.

Embodiments provide a Machine learning approach to solve the above-described problem.

Embodiments use machine learning to more accurately model fatigue life performance of additive manufactured components, without any a-priori assumptions on how different parameters affect fatigue life. The method is employed by a computer. Embodiments include a computer program implementing the method that is executed on a computer hardware, for example on a Personal Computer, Server Computer, Workstation, or another type of computer hardware. In an embodiment, the method and thus the executed computer program that implements the method is used in a product design process. The product design process may employ the method in an iterative way for optimization of a product and/or production design. The method may also be employed from start of a product or production design. Thus, by using the provided system, method or computer program a product design or a production step (i.e., additive manufacturing process), a better product may be achieved.

Embodiments include a system and a method for prediction of fatigue life properties of an additive manufactured element, specimen, or material structure, in an industrial product design or manufacturing, with a data collection step in which several data points for maximum stress vs. cycles to failure for different given processing steps, surface and volume conditions of the element, specimen or material structure are collected, with a training step in which a machine learning system is trained with the collected data, and with an evaluation step in which the trained machine learning system is confronted with new actual processing conditions and used to predict the fatigue life properties of the element, specimen, or material structure, and with an application step in which the predicted fatigue life properties are used to design the product or to parametrize an manufacturing process.

The evaluation step might be repeated in an iterative product design or production optimization process until a desired fatigue life property of the additive manufactured element, specimen, or material structure ("product") is achieved.

The task is also solved by a system for prediction of fatigue life properties of an additive manufactured element, specimen or material structure, for an industrial product design or manufacturing process, the system including computer hardware, the computer hardware being programmed with a Machine Learning system, the system being set up for conducting the training step and the evaluation step as described before, the system being setup for providing the results of the evaluation step to the industrial product design or manufacturing process.

The system includes a computing hardware (e.g., PC, Server) with a simulation software such as Simcenter 3D of Siemens and a Machine Learning environment. Additional software of that system includes a CAD system for product design. The system may be connected with an additive manufacturing system, e.g., a 3d-printer with 3D printing software. The system may also include conventional peripheries such as displays, memory, keyboard, data interfaces etc.

DETAILED DESCRIPTION

Figure 1:
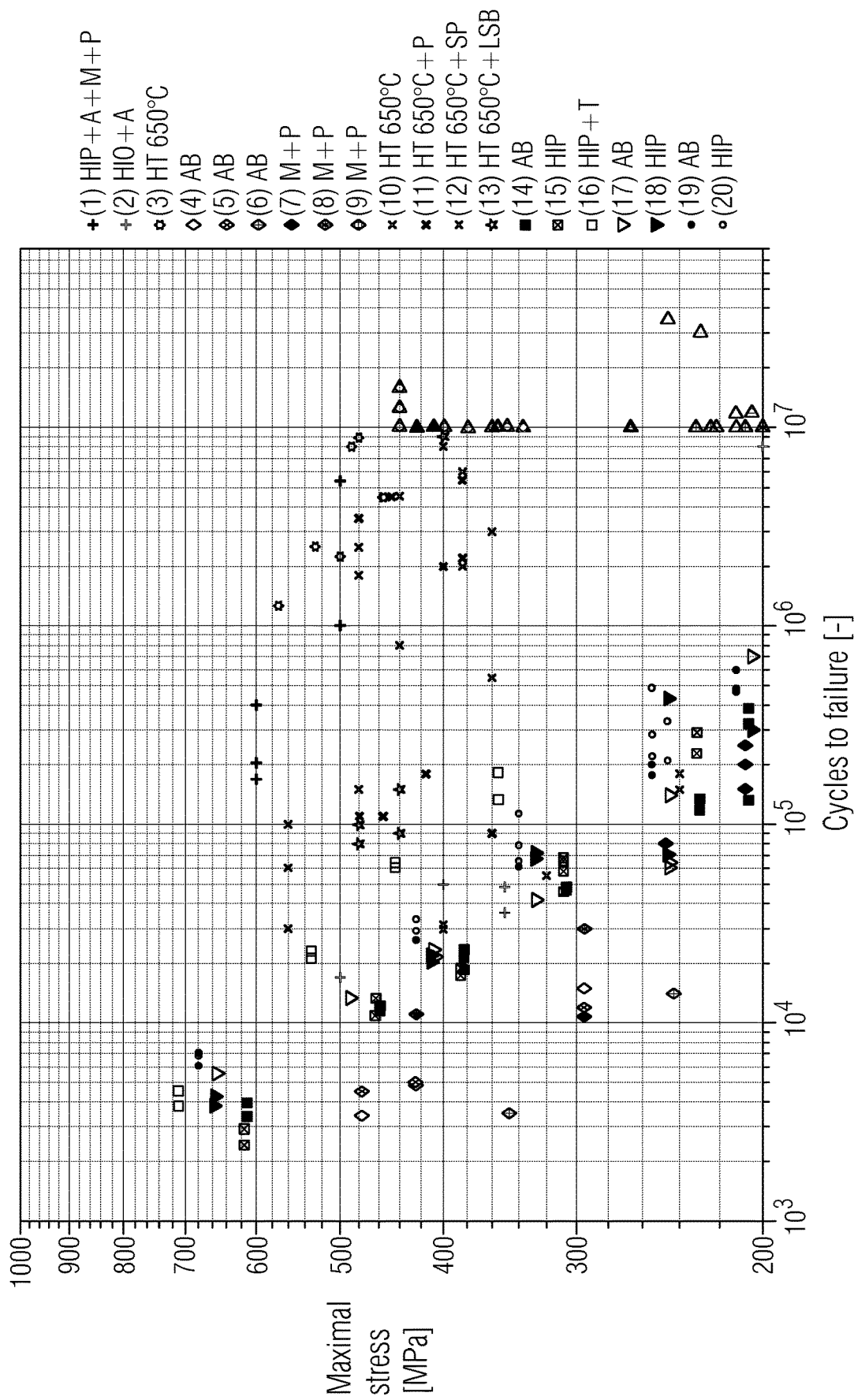
FIG. 1 depicts the scatter in fatigue behavior of additive manufactured titanium alloy specimens.
Figure 2:
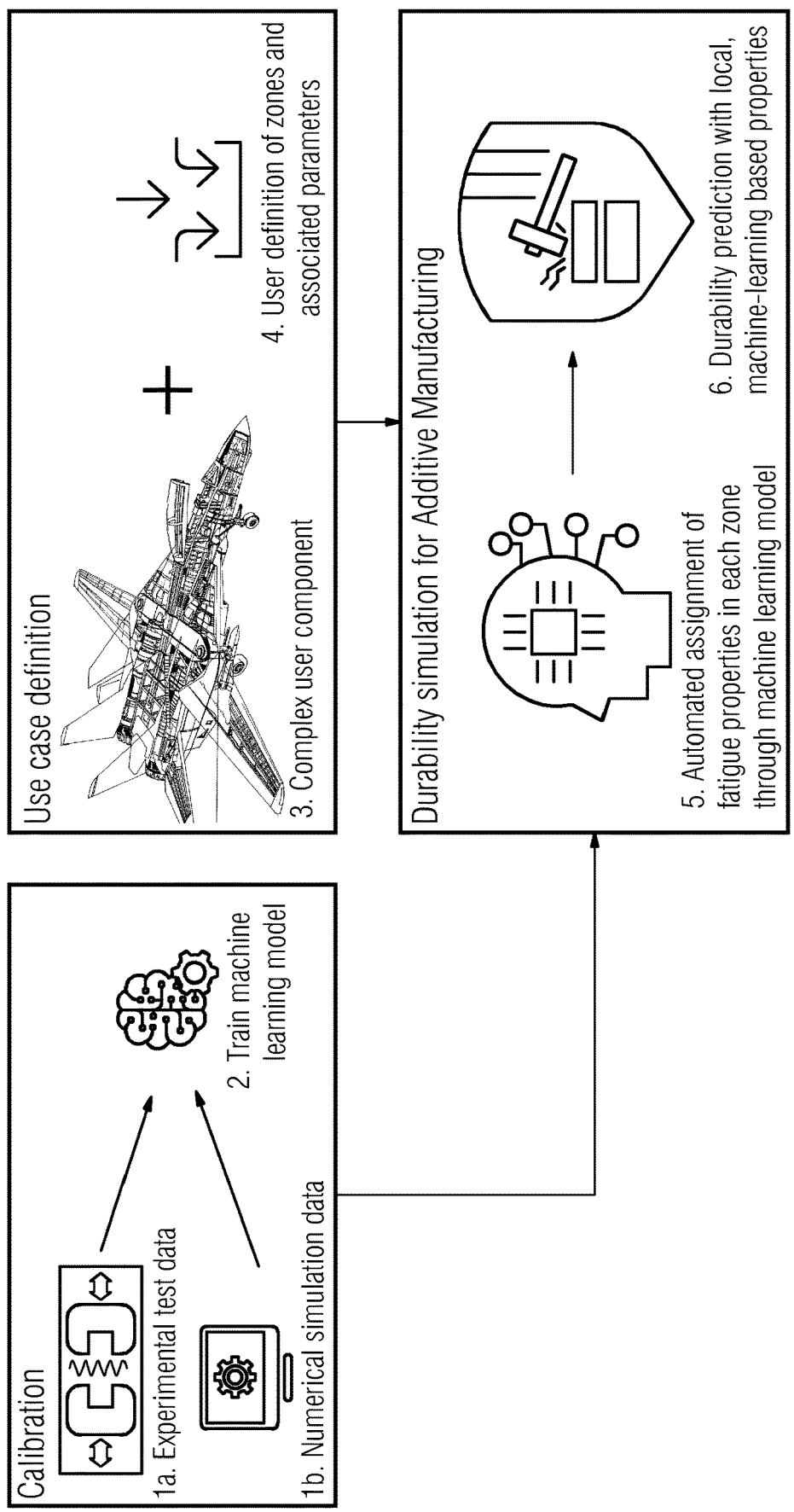
FIG. 2 depicts a diagram that describes a workflow according to an embodiment.

FIG. 2 depicts a diagram that describes a workflow.

The workflow starts in a first block "Calibration" with test data provided from experimental tests or numerical simulations (step 1a "Experimental Test Data" and step 1b "Numerical Simulation Data"), provided by the user. The test data from steps 1a, 1b is fed into a machine learning (step 2—"Train Machine Learning Model"). In an embodiment a Gaussian Progress Regression with Squared Exponential covariance function is used. The machine learning algorithm is trained in step 2. In parallel, the end-user defines the use case (second block—"Use Case Definition") with defining its components in step 3 "Complex User Component" and different zones in step 4 "User Definition of Zones and Associated Parameters" corresponding to different parameters (e.g., sections that are machined for better surface roughness, sections that contain increased porosity . . . ).

The use case from the use case definition, achieved by steps 3 and 4, is fed into a customized durability solver ("Durability Simulation for additive manufacturing") that may interpret the parameters from step 4 "User definition of zones and associated parameters". Per zone, an automated calculation is done to define the fatigue properties in step 5 ("Automated assignment of fatigue properties in each zone through machine learning model"), based on the trained model from step 2. The durability solver then calculates the accurate fatigue life in step 6 "Durability prediction with local machine-learning based properties) of the part by accounting for these specific features.

The main specific advantages come from having steps 2 and step 5 as part of the workflow, where machine learning (step 2) is combined with a zoning concept AAF (step 5), to determine accurate fatigue properties in step 6 and accounting for additive manufacturing related parameters for complex parts (by allowing different zones to be defined in a single component).

The system and the method provide several advantages. Embodiments do not require any prior/a priori knowledge or empirical rules on how the different parameters considered link together to predict fatigue life. Embodiments are fully flexible to extend to a very wide range of parameters without increasing complexity to the user. Embodiments allow for accounting for localized phenomena in additive manufactured components to better predict fatigue life. Embodiments provide the end-user better insights in how the material behaves and what the contribution of individual factors is, as insights may be generated that would not be possible merely on the basis of experimental data. Embodiments accept a combination of experimental results and numerical simulation results as input for Machine Learning. Embodiments provide a confidence interval on predicted fatigue life, giving the end-user an indication on how reliable the prediction is and whether additional tests need to be performed to guarantee the performance.

The advantages are mainly based on several technical features. By using Machine Learning (in an embodiment a Gaussian Progress Regression (GPR) approach has been adopted for initial technology validations, without pinpointing the application to this method) for fatigue prediction of additive manufactured components, only very limited assumptions are enforced on how the data should behave. As a result, the presented approach may capture the complex behaviors present in additive manufactured components without any additional user input. The only assumptions made are that of normal distribution (because of the central limit theorem and law of large numbers), and the definition of a covariance function.

The GPR has no limitation on the amount of input parameters that may be accepted, and therefore may be run on hundreds of parameters as easily as on only 3 components. No additional user input is required for this to work.

By considering localized parameters (roughness, porosity content . . . ) as input parameters for the GPR, the fatigue properties may be calculated on an element-by-element approach rather than on a full component. Thus, a complex structure may be divided into manageable and reusable parts.

GPR allows the prediction of fatigue life for any set of input parameters. As such, the impact of a single parameters on fatigue life may be studied even though these tests are impossible to reproduce experimentally.

The GPR methodology does not discern between experimental or numerical test data. As a result, it may handle purely experimental, purely numerical or hybrid combinations without any increase in complexity for the algorithm.

As GPR is based inherently on normalized distributions, a confidence interval is an inherent part of the method.

Users may perform more accurate fatigue simulations accounting for the complex response of additive manufactured components without specialist expertise on the topic, meaning that this solution requires less expertise.

Fatigue models may have localized properties (potentially generated automatically) to further refine the accuracy of the models.

One may quickly provide a solution for accurate fatigue modelling of AM (additive manufactured) components with minimal requirements from the end-user (except providing test data).

Embodiments satisfy the need for industrially viable solutions (i.e., accounting for defects). A new and unique aspect is using machine learning to account for (localized) phenomena typical to additive manufacturing and their impact on fatigue life (step 2 in FIG. 2). The outlined solution employs a Gaussian Progress Regression with squared exponential covariance function. Combining the machine learning approach with localized properties allows a part to have varying properties (step 5 in FIG. 2). Working on an element-by-element basis is already supported by the Specialist Durability solver, e.g., in Simcenter 3D of Siemens. Embodiments increase the value of this element-by-element approach, as it is capable of automatically calculating the proper fatigue properties for each element or zone.

An alternative solution to the presented problems is to replace the machine learning approach with any other modelling approach. Several approaches may be envisaged, although with their limitations and challenges. Nearest neighbor techniques tend to have very limited accuracy. Interpolation techniques require a very large dataset before any useful predictions may be made. In addition, only prediction entirely within the confines of calibrations points may be made. No extrapolation is possible in a multi-dimensional space. Parameter identification for predefined models have the drawback that defining a mathematical model is very challenging as the number of degrees-of-freedom (i.e., the parameters considered) increases. On top, it is known that separation-of-variables is not a valid assumption for additive manufacturing, that further complicates the development of a mathematical model. Even if a model may be determined, parameter identification is challenging and may require an optimization approach with may iterations before converging. Finally, the model may be difficult to extend if additional parameters need to be considered and may require a full re-definition of the model requiring expert knowledge. Adaptation of existing empirical rules includes the problem that most empirical rules only focus on a single parameter and are configured for conventional manufacturing. It is unlikely that these models apply without modification to the case of additive manufacturing and combining multiple rules may result in very poor correspondence as separation of variables is not realistic for additive manufacturing materials.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for prediction of Fatigue life properties of an Additive manufactured element, specimen, or material structure, in an industrial product design or manufacturing process, the method comprising:
   collecting data points provided from one or more experimental tests for maximum stress vs. cycles to failure for different given processing steps, surface, and volume conditions of the additive manufactured element, specimen, or material structure;
   training a Machine Learning System with the collected data points;
   providing a definition of topologic properties of the additive manufactured element, specimen, or material structure and a definition of different zones, each zone of the different zones comprising one or more topologic properties and conditions;
   predicting by the trained Machine Learning System, using new actual processing conditions, Fatigue life properties of the additive manufactured element, specimen, or material structure for the different zones; and
   designing or optimizing, using the predicted Fatigue life properties, an industrial product or to parametrize an manufacturing process.

2. The method of claim 1, wherein collecting data comprises collection of data points provided from a numerical simulation.

3. The method of claim 1, wherein the Machine Learning System comprises a Gaussian Progress Regression algorithm.

4. The method of claim 1, wherein predicting comprises using a customized durability solver.

5. The method of claim 1, wherein the result of predicting is used to optimize an Additive Manufacturing process, post-processing steps for the additive manufactured element, specimen, or material structure, or the Additive Manufacturing process and the post-processing steps for the additive manufactured element, specimen, or material structure.

6. A system for prediction of Fatigue life properties of an Additive manufactured element, specimen, or material structure, for an industrial product design or manufacturing process, the system comprising:

a computer hardware comprising: a Machine Learning system wherein the computer hardware is configured to collect data points from experimental tests for maximum stress vs. cycles to failure for different given processing steps, surface, and volume conditions of the additive manufactured element, specimen, or material structure and train the machine learning system with the collected data points, the computer hardware further configured to provide a definition of topologic properties of the additive manufactured element, specimen, or material structure and a definition of different zones, each zone of the different zones comprising one or more topologic properties and conditions, wherein the machine learning system is configured to predict, using new actual processing conditions, fatigue life properties of the additive manufactured element, specimen, or material structure for the different zones;

wherein the computer hardware is configured to provide the predicted fatigue life properties to the industrial product design or manufacturing process.

7. The system of claim 6, wherein the computer hardware is configured, using the predicted fatigue life properties, to optimize an additive manufacturing process, post-processing steps for the additive manufactured element, specimen, or material structure, or the additive manufacturing process and the post-processing steps for the additive manufactured element, specimen, or material structure.

8. The system of claim 6, wherein the computer hardware is configured to collect the data points from numerical simulation.

9. The system of claim 6 wherein the Machine Learning System employs a Gaussian Progress Regression algorithm.

10. The system of claim 6 wherein the Machine Learning System uses a customized durability solver.

* * * * *